United States Patent [19]

Bacon, Jr. et al.

[11] Patent Number: 5,614,286
[45] Date of Patent: Mar. 25, 1997

[54] CONFORMABLE CUBE CORNER RETROREFLECTIVE SHEETING

[75] Inventors: Chester A. Bacon, Jr., Oakdale; Gerald M. Benson, Woodbury, both of Minn.

[73] Assignee: Minnesota Mining and Manufacturing Company, St. Paul, Minn.

[21] Appl. No.: 139,914

[22] Filed: Oct. 20, 1993

[51] Int. Cl.$^6$ .................................................. B32B 3/00
[52] U.S. Cl. .......................... 428/161; 428/156; 428/167; 428/172; 428/212; 428/913; 359/530; 359/534; 359/535; 359/537; 359/542; 359/584
[58] Field of Search .................................. 428/195, 4 C, 428/411.1, 323, 913, 161, 156, 167, 172, 212; 359/529, 530, 534, 535, 537, 542, 584

[56] References Cited

U.S. PATENT DOCUMENTS

| | | | |
|---|---|---|---|
| B 586,663 | 2/1976 | Rowland | 350/103 |
| 3,190,178 | 6/1961 | McKenzie | 88/82 |
| 3,450,459 | 6/1969 | Haggerty | 350/103 |
| 3,684,348 | 8/1972 | Rowland | 350/103 |
| 3,689,346 | 9/1972 | Rowland | 156/245 |
| 3,700,305 | 10/1972 | Bingham | 350/105 |
| 3,712,706 | 1/1973 | Stamm | 350/103 |
| 3,924,929 | 12/1975 | Holmen et al. | 350/103 |
| 3,935,359 | 1/1976 | Rowland | 428/172 |
| 3,992,080 | 11/1976 | Rowland | 350/103 |
| 4,025,159 | 5/1977 | McGrath | 350/105 |
| 4,202,600 | 5/1980 | Burke et al. | 350/103 |
| 4,243,618 | 1/1981 | Van Arnam | 264/1 |
| 4,349,598 | 9/1982 | White | 428/161 |
| 4,486,363 | 12/1984 | Pricone et al. | 264/1.4 |
| 4,555,161 | 11/1985 | Rowland | 350/103 |
| 4,576,850 | 3/1986 | Martens | 428/156 |
| 4,588,258 | 5/1986 | Hoopman | 350/103 |
| 4,601,861 | 7/1986 | Pricone et al. | 264/1.6 |
| 4,775,219 | 10/1988 | Appeldorn et al. | 350/103 |
| 4,895,428 | 1/1990 | Nelson et al. | 350/103 |
| 5,066,098 | 11/1991 | Kult et al. | 359/540 |
| 5,077,117 | 12/1991 | Harper et al. | 428/143 |
| 5,117,304 | 5/1992 | Huang et al. | 359/529 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,189,553 | 2/1993 | Smith | 359/530 |
| 5,264,063 | 11/1993 | Martin | 156/247 |
| 5,272,562 | 12/1993 | Coderre | 359/529 |
| 5,491,586 | 2/1996 | Phillips | 359/530 |

FOREIGN PATENT DOCUMENTS

| | | |
|---|---|---|
| 0175031 | 3/1986 | European Pat. Off. . |
| 0200521 | 11/1986 | European Pat. Off. . |
| 2421402 | 10/1979 | France . |
| 2317871 | 10/1974 | Germany . |
| 2245219A | 1/1992 | United Kingdom . |
| WO95/03558 | 2/1995 | WIPO .......................... G02B 5/124 |
| WO95/07179 | 3/1995 | WIPO .......................... B32B 27/08 |

*Primary Examiner*—William Krynski
*Attorney, Agent, or Firm*—Gary L. Griswold; Walter N. Kirn; Peter L. Olson

[57] ABSTRACT

Conformable cube corner retroreflective sheetings comprising a plurality of discrete cube corner segments which are conformably bonded together, each cube corner segment comprising a plastic body portion having a substantially planar front major surface and at least one minutes cube corner retroreflective element projecting rearwardly from the body portion and defining a cube corner point side of the cube corner segment. The peripheries of the cube corner segments can be defined by a plurality of separations extending from the cube corner point sides to the front major surfaces, the separations being disposed between adjacent cube corner segments. Adjacent cube corner segments are conformably bonded together in the sense that they are either: (1) separated by a gap of less than about 1 millimeter and bonded together through a conformable carrier layer; or (2) separated by a gap which is substantially filled with a conformable resin that bonds the side walls of adjacent cube corner segments together.

20 Claims, 10 Drawing Sheets

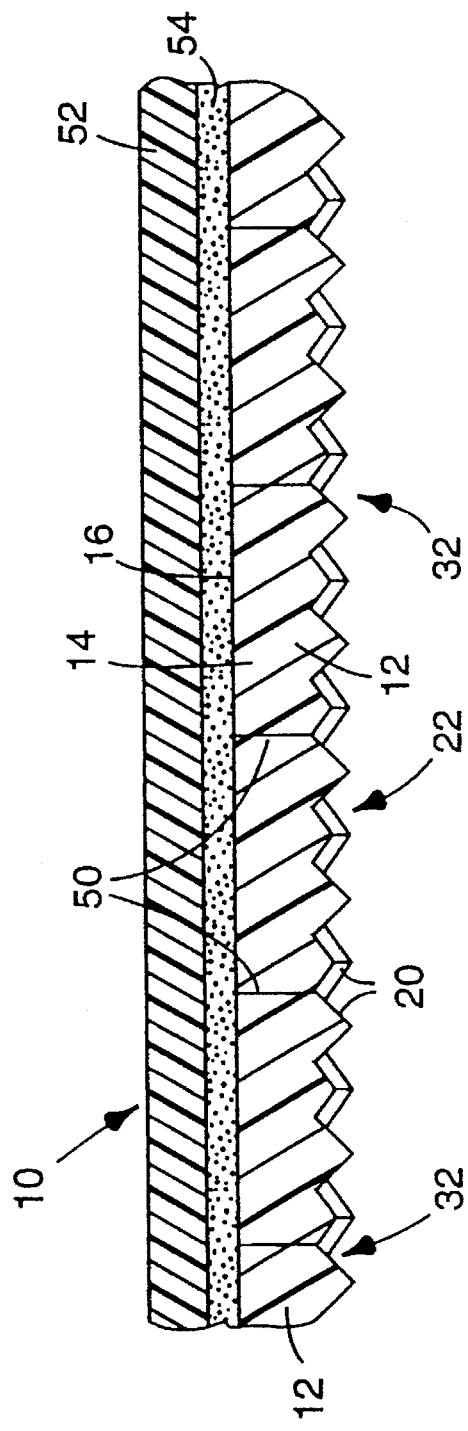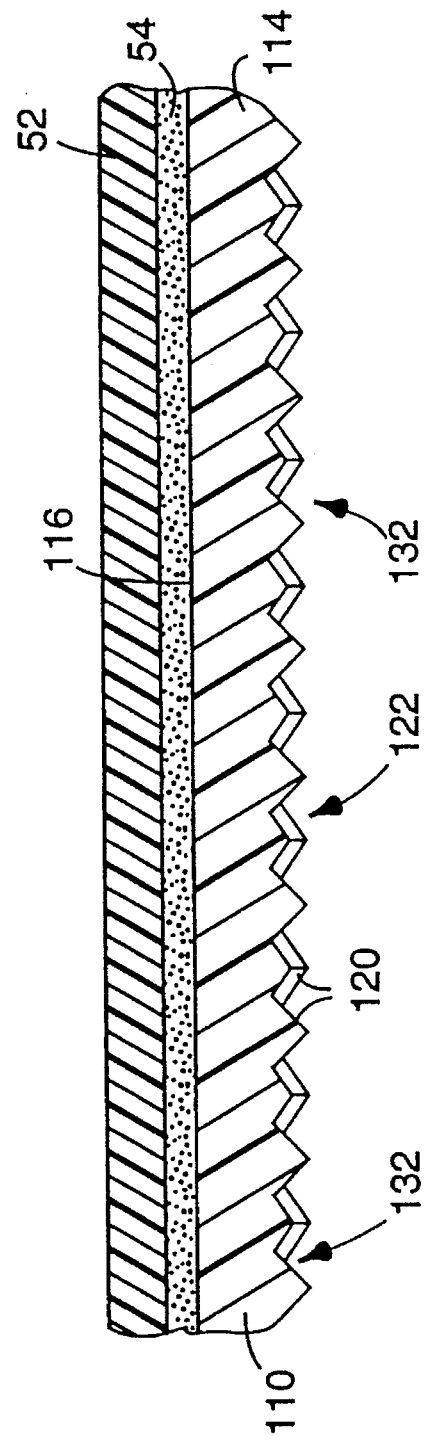

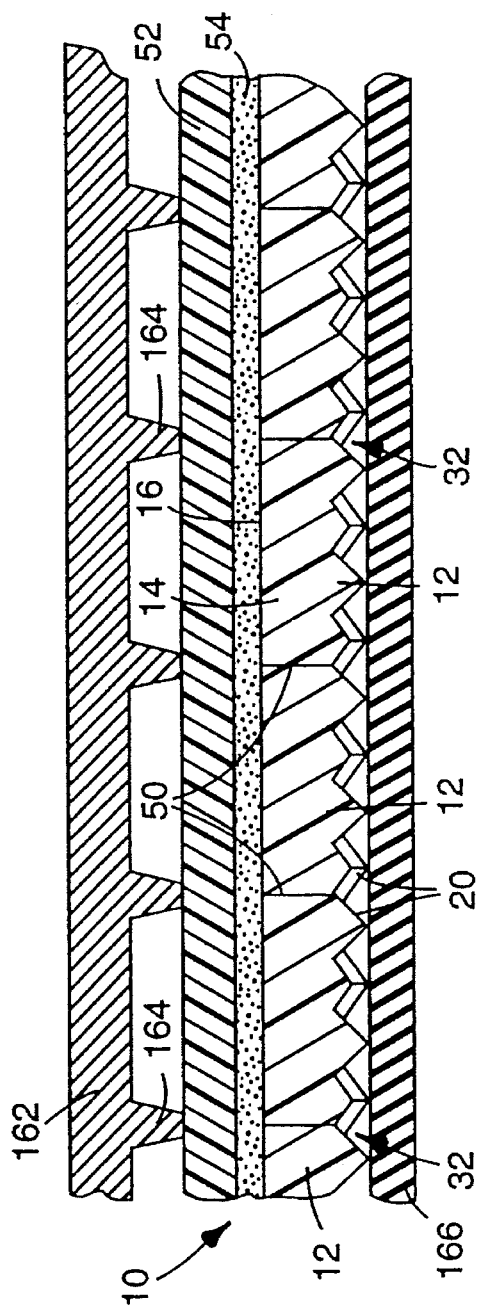
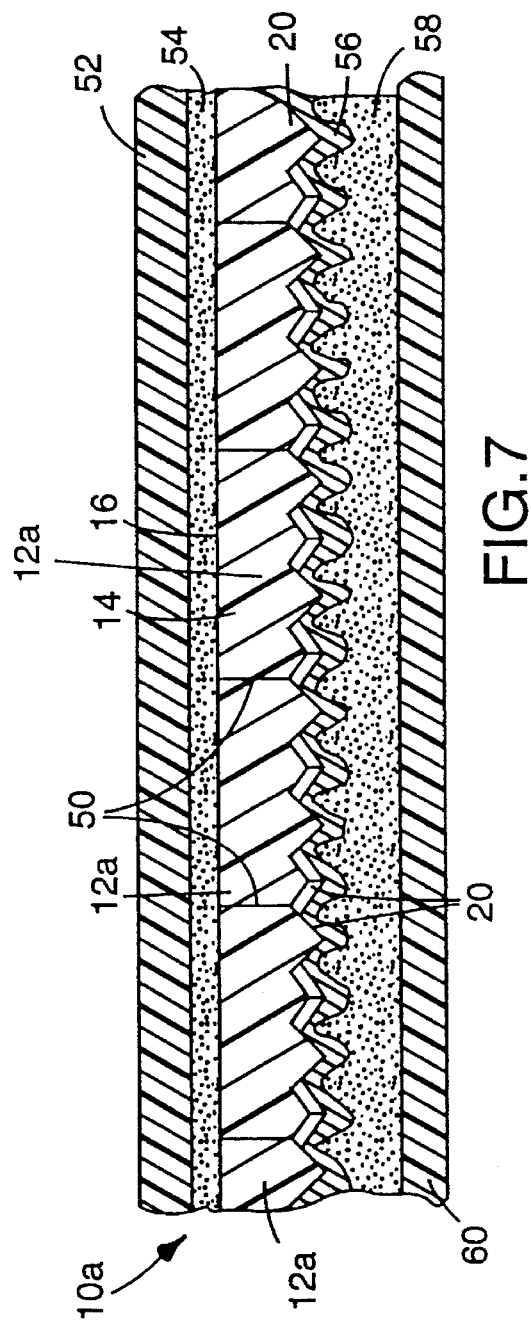
FIG.6
FIG.7

CONFORMABLE CUBE CORNER RETROREFLECTIVE SHEETING

FIELD OF INVENTION

The present invention relates to retroreflective articles, particularly cube corner type retroreflective articles.

BACKGROUND

Retroreflective articles are made in a variety of forms, including sheetings such as are used on traffic signs and license plates, rigid safety reflectors mounted on motor vehicles and bikes, and patches and appliques such as are applied to garments and book bags, etc. One major use of retroreflective sheeting is in the field of highway markings and signs to improve the visibility and legibility of informational signs, traffic directions, barriers, etc. to drivers.

One common type of retroreflector employs transparent microspheres, typically with hemispheric reflectors thereon. Illustrative examples of such retroreflectors are disclosed in U.S. Pat. No. 3,190,178 (McKenzie), U.S. Pat. No. 4,025,159 (McGrath), and U.S. Pat. No. 5,066,098 (Kult).

A second common type of retroreflector employs what are referred to as cube corner retroreflective elements. Such cube corner retroreflectors typically comprise a sheet having a generally planar front surface and an array of cube corner elements protruding from the back surface. In use, the retroreflector is arranged with the front surface disposed toward the anticipated location of intended observers. Light incident to the front surface enters the sheet, passes through the body of the sheet to be internally reflected by the faces of the elements so as to exit the front surface in a direction substantially toward the light source, i.e., retroreflection. Illustrative examples of cube corner type retroreflectors are disclosed in U.S. Pat. No. 3,712,706 (Stamm), U.S. Pat. No. 4,025,159 (McGrath), U.S. Pat. No. 4,202,600 (Burke et al.), U.S. Pat. No. 4,243,618 (Van Arnam), U.S. Pat. No. 4,349,598 (White), U.S. Pat. No. 4,576,850 (Martens), U.S. Pat. No. 4,588,258 (Hoopman), U.S. Pat. No. 4,775,219 (Appeldorn et al.) and U.S. Pat. No. 4,895,428 (Nelson et al.). Cube corner retroreflectors have commonly been employed as safety devices on bicycles, automobiles, and other vehicles as well as on traffic signs.

Cube corner retroreflectors typically have a higher retroreflective efficiency than microsphere-based retroreflectors and are sometimes preferred for application to substrates for this reason. However, retroreflective posts, cones, barrels, safety helmets, and corrugations or rivets on truck trailer surfaces require that the sheeting bend and conform to curved substrates. The cubes of cube corner retroreflectors are typically made of resins having high glass transition temperatures so that the cubes maintain their dimensions, and thus are capable of providing bright retroreflection, upon being exposed to high temperatures or high levels of humidity over time. Such resins are typically rigid (i.e., have a high flexural modulus). Unlike microsphere-based sheetings where the microspheres are generally much higher in modulus than the binder resin in which the microspheres are embedded, the cube corner retroreflective elements of cube corner retroreflectors tend to undergo significant optically degrading deformation as the retroreflector is conformed to a non-planar substrate because the high modulus cubes are typically similar in modulus to the rest of the sheeting.

U.S. Pat. No. 3,684,348 (Rowland) discloses a retroreflective composite material which is adapted to be shaped and mounted to surfaces of various configurations. The composite material comprises a flexible body portion to which a multiplicity of minute cube corner elements are adhered. The cube corner elements have a side edge dimension of up to 25 mils (625 microns), but preferably less than 10 mils (250 microns) along the side edge.

In U.S. Pat. No. 3,992,080 (Rowland), it is noted that the cube corner elements of the retroreflective composite material disclosed in U.S. Pat. No. 3,684,348 are distorted when the material is stretched during application to a support surface, and such distortion renders the cube corner faces non-orthogonal to a degree, resulting in significant loss of brightness.

U.S. Pat. No. 4,555,161 (Rowland) discloses a retroreflective laminar sheet assembly comprising flexible base and cover sheets and an array of retroreflective film pieces seated within discrete adjacent cells formed by bonding of the base and cover sheets at selected areas. One retroreflective film piece is contained within each cell and typically is made of minute cube corner retroreflective elements. Typically, there is a gap of about ⅛ to ½ inch (0.3 to 1.3 cm) between the edge of each film piece and the adjacent bonding area. The retroreflective laminar sheet assembly can be formed into a collar and mounted upon a traffic cone as shown in FIG. 3 of the patent. However, it is believed that the sheet assembly is not particularly useful when mounted to non-planar substrates which have intricate shapes or very small dimensions such as truck trailer rivets and corrugations because of the shear size of the gaps and film pieces in the sheet assembly. These gaps are typically much smaller than the retroreflective film pieces, which are rigid. The gaps present areas of the sheet assembly which are not capable of retroreflecting light. It is believed that if more film pieces and gaps were provided in a given unit of area of the sheet assembly to achieve greater flexibility, retroreflective brightness would be greatly sacrificed because of the width of the gaps relative to the width of the film pieces. In other words, the gaps can likely be made only so small before bonding of the base and cover sheets in the bonding areas is not possible. In addition, the patent discloses that the base and cover sheets are flexible to provide for flexible constructions, but does not disclose conformable base and cover sheets to provide for conformable constructions. Lastly, the sheet assembly is typically difficult to manufacture because the retroreflective film pieces must generally be cut and arranged in stacks in the manufacturing process.

SUMMARY OF INVENTION

The present invention provides cube corner type retroreflective sheetings which are conformable to non-planar substrates and methods for making such sheetings. Such sheetings are particularly adapted to be applied to the corrugated surfaces of truck trailers and protruding rivets thereof. Other possible applications are in construction work zones, personal safety, safety at sea, and any other area where conformability of highly efficient retroreflective sheetings is needed.

In brief summary, the invention provides in one of its aspects a conformable cube corner retroreflective sheeting comprising a plurality of discrete cube corner segments which are conformably bonded together, each cube corner segment comprising a plastic body portion or land having a substantially planar front major surface and Side walls and at least one minute cube corner retroreflective element projecting rearwardly from the body portion and defining a cube corner point side of the cube corner segment. The word "conformable" is used herein to describe a material which is capable of being shaped or formed. In particular, the term "conformable" is used herein to describe materials such as carrier layers and sheetings which are omni-directionally extensible at some ambient application temperature or elevated temperature and can take essentially the same shape as non-planar substrates to which the materials are conformed. The word "discrete" is used herein to indicate that the cube corner segments are not rigidly connected together. The phrase "conformably bonded together" and close variants of this phrase are used herein to indicate that adjacent cube corner segments are at least one of the following: (1) separated by a gap of less than about 1 millimeter and bonded together through a conformable carrier layer; or (2) separated by a gap which is substantially filled with a conformable resin that bonds the side walls of adjacent cube corner segments together. Each cube corner retroreflective element typically has a plurality of facets or faces and a base adjacent the body portion. Typically, substantially all of the cube corner retroreflective elements located closest to the side walls of the body portions are intact and capable of retroreflecting light.

The peripheries of the cube corner segments can be defined by a plurality of separations extending from the cube corner point sides to the front major surfaces of the cube corner segments, the separations being disposed between adjacent cube corner segments. The term "separations" is used interchangeably herein with the term "gaps," and is intended to denote any separations in the continuity of a sheeting, whether the separations are caused by:

a) cutting the sheeting with a cutting device utilizing a laser beam or a sharp edge;

b) stretching or flexing the sheeting with the sheeting optionally being scored in the areas where separations are desired;

c) molding the sheeting to form such separations;

d) propagating a discontinuity in the sheeting, the discontinuity typically being initiated by thermally shocking the sheeting, mechanically or ultrasonically vibrating the sheeting, impacting the sheeting for a short duration, Or mechanically stressing the sheeting; or e) any other suitable process, Typically, the cube corner segments are defined by a pattern of the separations. Such a pattern can comprise a plurality of contiguous polygons selected from the group consisting of parallelograms, triangles, and hexagons.

As noted above, adjacent cube corner segments can be separated by a gap of less than about 1 millimeter and bonded together through a conformable carrier layer. The conformable carrier layer can comprise a continuous, transparent film which is bonded to the front major surfaces of the cube corner segments, typically through a transparent adhesive.

Also, as noted above, the cube corner segments can be bonded together through a conformable resin disposed in the gaps between adjacent cube corner segments. The conformable resin bonds the side walls of adjacent cube corner segments together. The gap between adjacent cube corner segments can range between about 0.5 and about 3 millimeters. Further, a back sealing film can be disposed adjacent the cube corner retroreflective elements and bonded to the cube corner segments through the conformable resin. Also, a continuous, transparent film can be bonded to the front major surfaces through the conformable resin, the conformable resin typically being transparent.

In another of its aspects, the invention relates to a method for making a conformable cube corner retroreflective sheeting, comprising:

a) providing a tool having a molding surface which comprises a plurality of raised protrusions and retroreflective element-forming cavities adapted for molding a cube corner retroreflective sheeting comprising a plurality of the above-described cube corner segments;

b) depositing a hardenable molding material on the molding surface of the tool, the molding material being sufficient in amount and fluidity to essentially completely fill the cavities;

c) applying a conformable carrier layer to the molding material on the molding surface under sufficient pressure to effect intimate surface contact between the carrier layer, the raised protrusions of the tool, and the molding material;

d) effecting substantial solidification of the molding material and bonding of the molding material to the carrier layer to form the conformable sheeting; and e) removing the conformable sheeting from the molding surface.

In another of its aspects, the invention relates to a method for making a conformable cube corner retroreflective sheeting, comprising:

a) providing the tool described in the above method;

b) placing a thermoplastic sheet on the tool;

c) heating the resin of the sheet to a temperature at least as high as its softening temperature;

d) pressing the sheet onto the molding surface of the tool to thereby form a plurality of cube corner segments;

e) conformably bonding the cube corner segments together with a conformable carrier layer to form the conformable sheeting; and f) removing the conformable sheeting from the tool.

The term "softening temperature" is a well known term of art. It is used herein to denote the temperature at which a material first softens and is capable of being pressed into a desired shape upon heating the material. U.S. Pat. No. 5,117,304 (Huang et al.) discloses a suitable method for measuring the softening temperature of a polymer sample and is incorporated herein by reference.

The invention also relates to a method for making a conformable cube corner retroreflective sheeting, comprising the steps of:

a) providing an initial cube corner retroreflective sheeting comprising a plastic body portion having a substantially planar front major surface and a multiplicity of minute cube corner retroreflective elements projecting rearwardly from the body portion and defining a cube corner point side of the initial sheeting;

b) dividing the body portion into a plurality of the above-described cube corner segments so that they are discrete and so that the peripheries of the cube corner segments are defined by a plurality of separations extending from the cube corner point sides of the cube corner segments to the front major surfaces of the cube corner segments; and c) conformably bonding the cube corner segments together to form the conformable sheeting.

A tool having a plurality of raised protrusions or a cutting device utilizing a laser beam or a sharp edge can be used in carrying out the body portion dividing step. Typically, if the tool is used, pressure is applied against the front major surface of the initial sheeting with the raised protrusions of the tool.

Further, the method can comprise the steps of substantially filling the separations with a conformable resin so that the conformable resin contacts the side walls of adjacent cube corner segments, and effecting substantial solidification of the conformable resin so that it conformably bonds the cube corner segments together. If desired, the conformable carrier layer and conformable resin can be stretched to increase the width of the separations (i.e., to increase the gap between adjacent cube corner segments).

In yet another of its aspects, the invention relates to another type of conformable cube corner retroreflective sheeting comprising a plurality of cube corner segments bonded together through a conformable carrier layer, wherein the peripheries of the cube corner segments are defined by grooves extending vertically from the cube corner point sides toward the front major surfaces and terminating at connecting bridges which are disposed horizontally between and are integral with adjacent cube corner segments, the connecting bridges being at least one of fractured and frangible. The connecting bridges are typically substantially thinner than and made of the same material as the body portions of adjacent cube corner segments.

BRIEF DESCRIPTION OF DRAWING

The invention will be further explained with reference to the drawing, wherein:

FIG. 1 is a diagrammatical cross section through a conformable cube corner retroreflective sheeting of the invention, showing a plurality of discrete cube corner segments of the sheeting, the sheeting being cut away at each end;

FIG. 5 is a diagrammatical cross section through a composite of an initial cube corner retroreflective sheeting, conformable carrier layer, and optional adhesive layer used in making the conformable sheeting of FIG. 1, the composite being cut away at each end;

FIG. 6 illustrates the composite of FIG. 5 being fractured by a tool having a raised pattern of protrusions to thereby form a conformable sheeting like the conformable sheeting of FIG. 1;

FIG. 7 is similar to FIG. 1 but shows a specularly reflective coating, adhesive layer, and release liner applied to the sheeting thereof;

Figure 2:
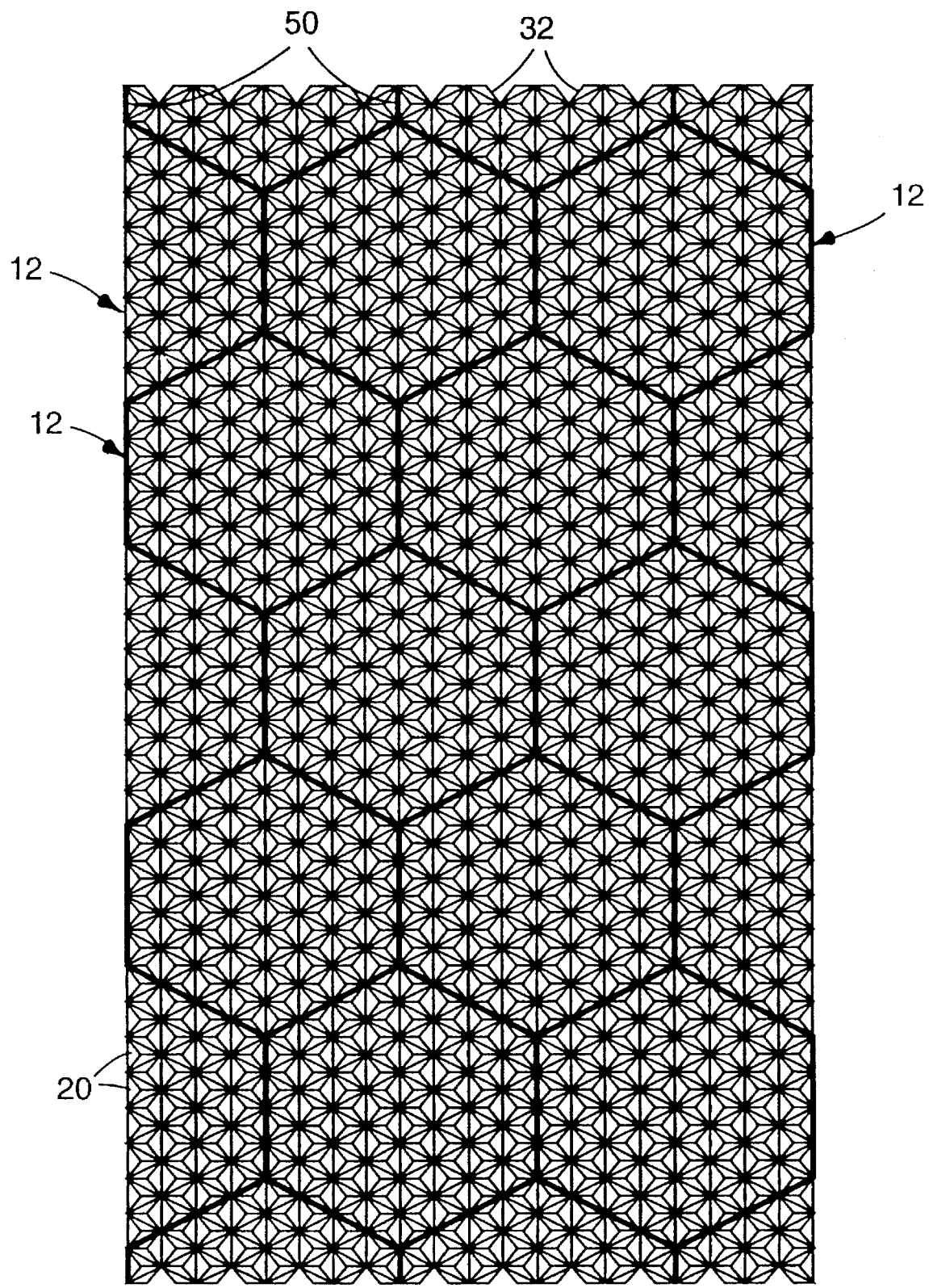
FIG. 2 is a bottom view, of the sheeting of FIG. 1, showing the microreplicated grooves which define the facets of the cube corner retroreflective elements of the sheeting, showing the apices of the cube corner elements, and showing a hexagonal pattern of separations separating the discrete cube corner segments.

These figures, which are idealized, are not to scale and are intended to be merely illustrative and non-limiting.

DETAILED DESCRIPTION OF ILLUSTRATIVE EMBODIMENTS

Turning now to the figures of the drawing, like reference numerals refer to like parts of the illustrated embodiments. Referring to FIG. 1, conformable cube corner retroreflective sheeting 10 of the invention comprises a plurality of discrete cube corner segments 12 which are conformably bonded together. Each cube corner segment 12 comprises plastic body portion or land 14 having substantially planar front major surface 16, side walls at the locations of reference numeral 50, and at least one and typically a plurality of minute cube corner retroreflective elements 20 projecting rearwardly therefrom and defining cube corner point side 22 of cube corner segment 12.

Several types of cube corner retroreflective elements are known in the art and may be used in the present invention. Illustrative examples are disclosed in the aforementioned U.S. Pat. Nos. 3,712,706, 4,202,600, 4,243,618, 4,349,598, 4,588,258, 4,775,219 and 4,895,428. Each of these patents is incorporated by reference herein in its entirety.

Each cube corner retroreflective element 20 comprises a plurality of (e.g., three) facets, faces, or sides which project rearwardly from body portion 14 and are defined in part by a plurality of microreplicated grooves 32 (see also FIG. 2)

formed in conformable sheeting 10. For example, the bases of the cube corner retroreflective elements can be equilateral triangles, each triangle having a height of between about 5 mils (125 microns) and about 15 mils (375 microns). Referring to FIG. 2, cube corner retroreflective elements 20 are typically provided in the form of an array (i.e., an orderly arrangement such as a regularly repeating pattern) by providing an orderly arrangement of microreplicated grooves 32. In each of FIGS. 2, 3, and 4, there are shown three sets of parallel microreplicated grooves 32 although it is certainly contemplated that other types of microreplicated groove patterns could be used such as, for example, the pattern disclosed in the aforementioned U.S. Pat. No. 4,895,428. In this patent, the cube corner retroreflective elements thereof comprise rectangular bases formed by two sets of parallel microreplicated grooves. Referring again to FIG. 1, cube corner retroreflective elements 20 are preferably integral with body portion 14, i.e., body portion 14 may be structured in the form of or integral with cube corner retroreflective elements 20.

Figure 3:
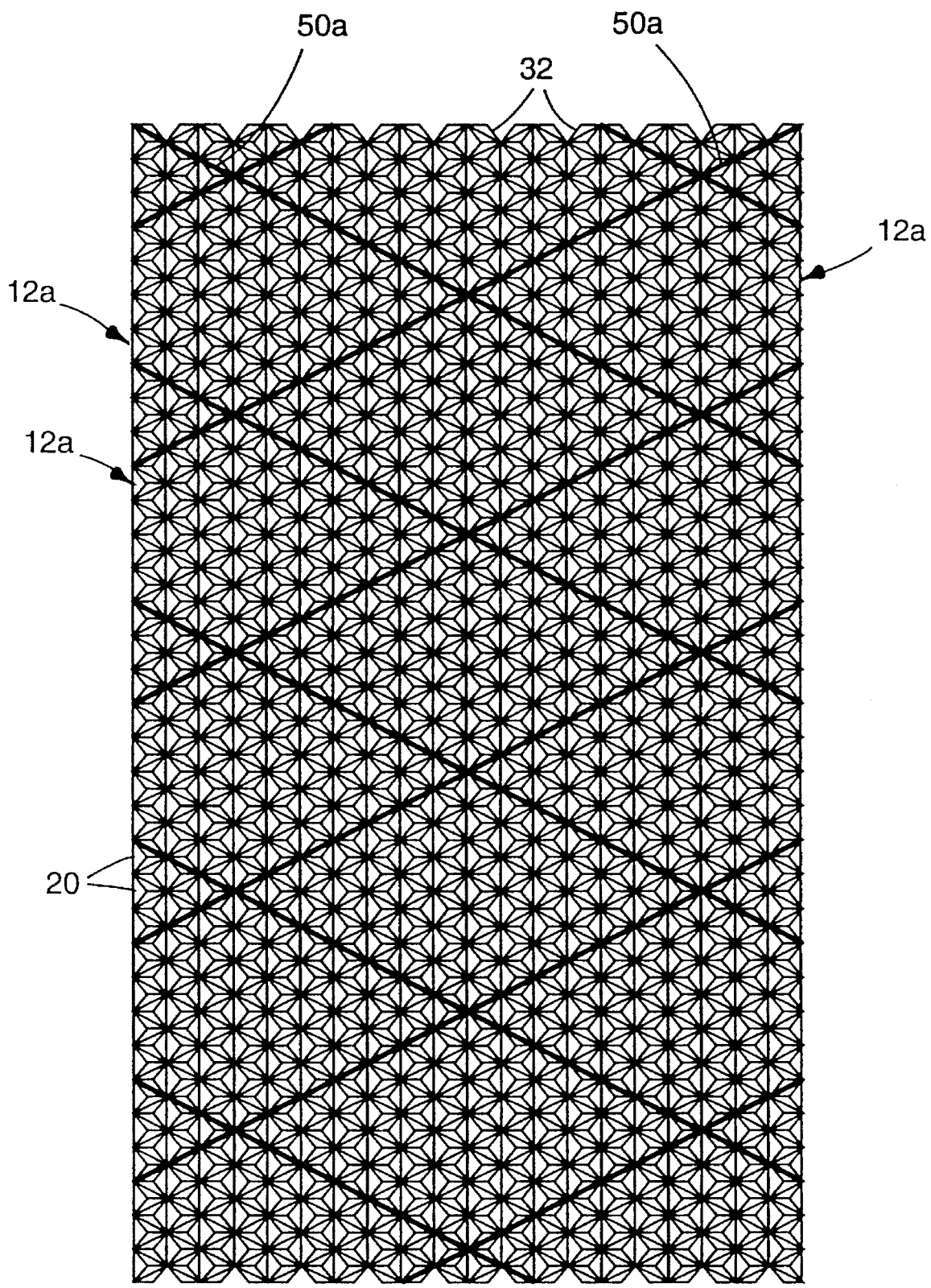
FIG. 3 is similar to FIG. 2 but shows a parallelogram pattern of separations.
Figure 4:
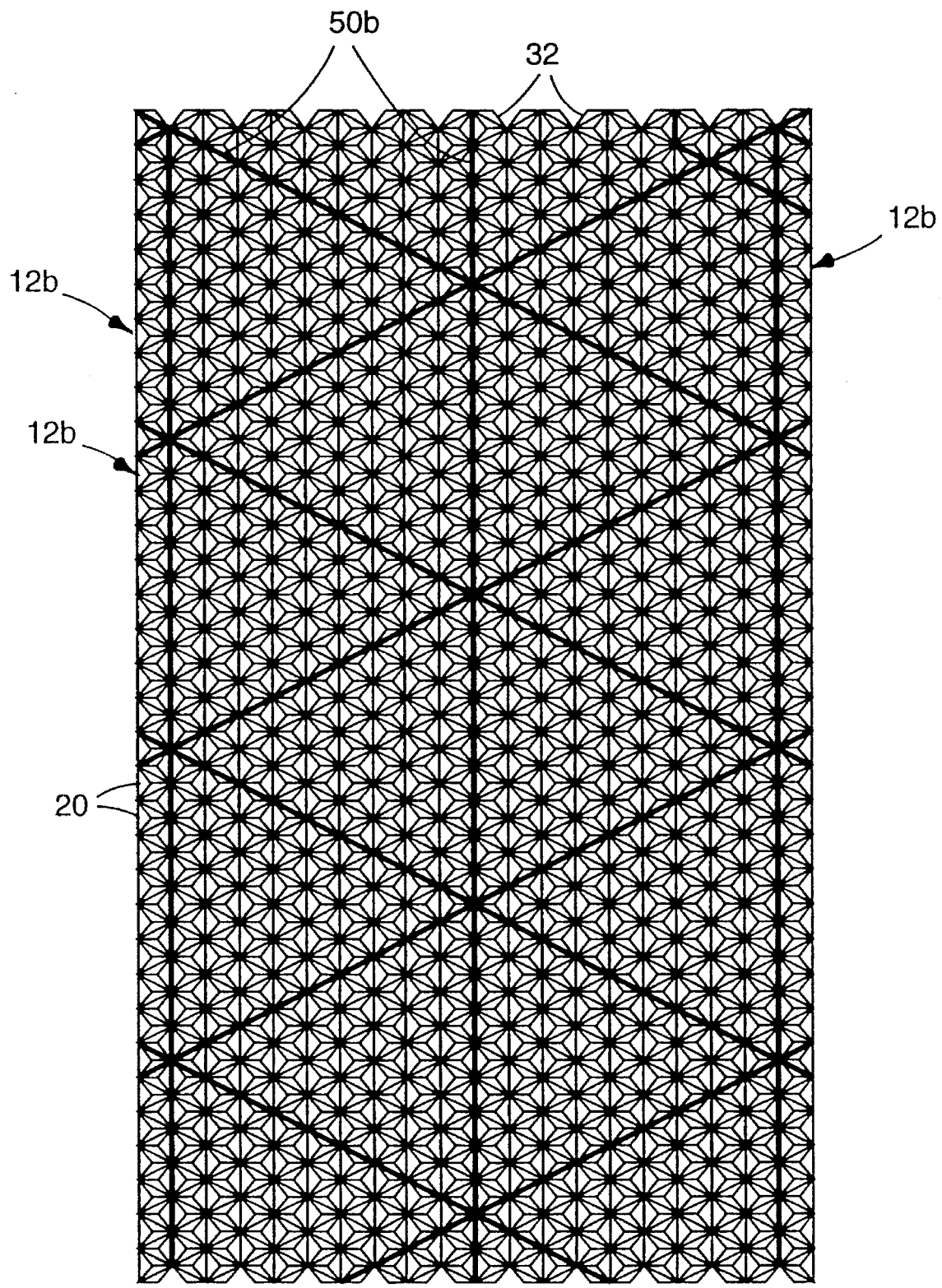
FIG. 4 is similar to FIG. 2 but shows a triangular pattern of separations.

The periphery of each tube corner segment 12 is defined by a plurality of separations or gaps 50 extending from cube corner point side 22 to front major surface 16 of the cube corner segment. In other words, cube corner segments 12 are discrete (not attached to each other in a rigid manner) and separated by separations 50. Conformable sheeting 10 typically comprises between about 1,000 and about 10,000 cube corner segments per square foot (between about 10,000 and 110,000 cube corner segments per square meter). Greater conformability of the sheeting can be achieved with high numbers of cube corner segments per unit of area of the sheeting. Typically, substantially all of the cube corner retroreflective elements located closest to the side walls of body portions 14 of cube corner segments 12 are intact and capable of retroreflecting light. Further, cube corner segments 12 are typically defined by a pattern of separations 50. For example, illustrative patterns of separations 50, 50a, and 50b are depicted in FIGS. 2, 3 and 4, respectively. In FIG. 2, the pattern comprises a plurality of contiguous hexagons. In FIG. 3, the pattern comprises a plurality of contiguous parallelograms. In FIG. 4, the pattern comprises a plurality of contiguous triangles. Thus, in the embodiment of FIG. 2, cube corner segments 12 have the shapes of hexagons when viewed from the bottom of the sheeting. In the embodiment of FIG. 3, cube corner segments 12a have the shapes of parallelograms when viewed from the bottom of the sheeting. In the embodiment of FIG. 4, cube corner segments 12b have the shapes of triangles when viewed from the bottom of the sheeting.

Although cube corner segments 12 are discrete, they are conformably bonded together. For example, as shown in FIG. 1, adjacent cube corner segments 12 can be separated by a gap of less than about 1 millimeter and bonded together through conformable carrier layer 52. Conformable carrier layer 52 is typically bonded to front major surfaces 16 of body portions 14 of cube corner segments 12.

If desired, conformable carrier layer 52 can comprise a continuous, transparent film which is bonded to front major surfaces 16 through optional, typically transparent, adhesive layer 54. For example, conformable carrier layer 52 can comprise a 2 mil (50 micron) thick, plasticized poly(vinyl chloride) film or polyurethane film (made from polyurethane pellets having the trade designation 58277 from B. F. Goodrich Company, Specialty Polymers & Chemical Division of Cleveland, Ohio or polyurethane pellets having the trade designation PN-3429 or PN-03 from Morton International, Specialty Chemicals Group, of Seabrook, N. H.).

Alternatively, conformable carrier layer 52 can comprise ionomers of polyethylene copolymers such as Surlyn™ 9910 from Du Pont Company, Polymer Products Department, of Wilmington, Del.; poly(ethylene-methacrylic acid) copolymers; poly(ethylene-acrylic acid) copolymers; or fluorocarbon polymers.

In any event, the conformable carrier layer comprises a conformable material such as, for example, a material which is omni-directionally extensible at some ambient application temperature or elevated temperature. In particular, the conformable carrier layer can comprise a conformable material which is characterized as being omni-directionally extensible upon being heated to a temperature above room or ambient temperature. However, the cube corner segments must be made of a material which will remain dimensionally stable at the elevated temperature needed for making the carrier layer extensible. For example, a suitable conformable sheeting can be made if conformable carrier layer 52 comprises rigid (non-plasticized) poly(vinyl chloride) resin and cube corner segments 12 comprise poly(methyl methacrylate) resin. When such a conformable carrier layer is heated to a temperature of about 90° C., it can be conformed as needed to non-planar substrates while conformably bonding cube corner segments 12 together. Because poly(methyl methacrylate) does not soften at this elevated temperature, cube corner segments 12 remain dimensionally stable so,that the optical clarity of cube corner retrore elective elements 20 is not affected.

Conformable carrier layer 52 typically has a softening temperature greater than about 50° C. If conformable carrier layer 52 is intended to be extensible at room temperature, it will typically have a tensile modulus of less than about $100 \times 10^3$ lbs/in$^2$ (about $6.9 \times 10^8$ N/m$^2$). When it is intended that conformable carrier layer 52 form a permanent part of the conformable sheeting even after application of the sheeting to a substrate, it may be desirable that conformable carrier layer 52 be resistant to degradation from ultraviolet radiation and have good light transmission properties. However, it is further contemplated that conformable barrier layer 52 could comprise a release liner, e.g., a polyethylene or polyester film. The release liner could be bonded to front major surfaces 16 and easily removed therefrom after application of conformable sheeting 10 to a substrate.

Body portions 14 and cube corner retroreflective elements 20 are typically made of a material having a relatively high modulus in comparison to the materials of conformable carrier layer 52 and optional adhesive layer 54. Body portions 14 and cube corner retroreflective elements 20 typically have good light transmission properties and tensile module of greater than about $150 \times 10^3$ lbs/in$^2$ (about $10.3 \times 10^8$ N/m$^2$) and preferably above about $200 \times 10^3$ lbs/in$^2$ ($13.8 \times 10^8$ N/m$^2$). Thus, both conformable carrier layer 52 and optional adhesive layer 54 typically comprise a relatively low modulus material in comparison to the material of body portions 14 and cube corner retroreflective elements 20. Illustrative examples of polymers that can be used in making body portions 14 and cube corner retroreflective elements 20 include acrylic polymers, such as poly(alkyl methacrylate), especially poly(methyl methacrylate); polyacrylonitrile; celluloses, such as cellulose (acetate-co-butyrate); epoxies; fluoropolymers, such as poly(vinylidene fluoride); polyamides, such as nylons; poly(amide-coimide); polycarbonate, such as Lexan™ from General Electric Company of Pittsfield, Mass.; polyesters, such as poly(butylene terephthalate) and poly(ethylene terephthalate); acrylic modified vinyl chloride polymers; styrene copolymers, such as poly(styrene-co-acrylonitrile) and poly(styrene-co-acrylonitrile-co-butadiene); polysulfone; poly(vinyl chloride); certain thermosetting and alkyd materials, such as poly-(melamine-formaldehyde); and mixtures of such polymers, such as polyester and polycarbonate blends and fluoropolymer and acrylic polymer blends.

Referring to FIG. 5, a conformable cube corner retroreflective sheeting like conformable sheeting 10 (shown in FIG. 1) can be made by first providing an initial, generally rigid cube corner retroreflective sheeting 110 comprising plastic body portion 114 having substantially planar front major surface 116 and a multiplicity of minute cube corner retroreflective elements 120 projecting rearwardly from body portion 114 of sheeting 110 and defining cube corner point side 122 of initial sheeting 110. Each cube corner retroreflective element 120 has a plurality of (e.g., three) facets which project rearwardly from body portion 114 and are defined in part by a plurality of microreplicated grooves 132 formed in sheeting 110.

Many types of cube corner retroreflective sheetings are known in the art and would be suitable for use herein as initial sheeting 110. Illustrative examples are disclosed in the aforementioned U.S. Pat. Nos. 3,712,706, 4,202,600, 4,243,618, 4,349,598, 4,588,258, 4,775,219, and 4,895,428.

After providing initial sheeting 110, conformable carrier layer 52 is typically bonded to front major surface 116 of initial sheeting 110 although it could alternatively be bonded (either directly or through an intermediate layer) to the facets of the cube corner retroreflective elements. Conformable carrier layer 52 can be bonded to the initial sheeting through optional adhesive layer 54. Then, as shown in FIG. 6, tool 62 having a plurality of raised protrusions 164 can be used to form separations in the initial sheeting and thereby form conformable sheeting 10. The protrusions of the tool apply pressure against conformable carrier layer 52, which transmits the pressure to adhesive layer 54, which transmits the pressure to the front major surface of the initial sheeting to thereby divide the body portion into a plurality of discrete cube corner segments 12. For example, tool 162 can be pressed against conformable carrier layer 52 at a pressure of about 200 lb/in$^2$ (1.38×10$^6$ N/m$^2$) for less than a second. Typically, rubber cushion 166 is provided on the side of the sheeting opposite tool 162 to assist in fracturing the body portion of the initial sheeting cleanly along the apices of the microreplicated grooves which are closest to protrusions 164.

Because the sheeting typically tends to fracture along the apices of its microreplicated grooves rather than in a random fashion, few or no cube corner retroreflective elements are destroyed or optically distorted during the fracturing step. Thus, the resulting conformable sheeting suffers minimal brightness loss as a result of the fracturing process. If desired, the initial sheeting can be chilled, e.g., by contacting it with dry ice (a temperature of about −78° C.) for about three minutes, prior to fracturing the sheeting to make the sheeting more brittle, to facilitate extremely rapid fracturing at the apices of the microreplicated groove sites, and to minimize the amount of optical distortion on either side of the groove sites.

After the fracturing step (i.e., the division of the body portion into a plurality of discrete cube corner segments), cube corner segments 12 are conformably bonded together by conformable carrier layer 52 and optional adhesive layer 54. Although as described above, conformable carrier layer 52 and optional adhesive layer 54 were secured to the initial sheeting prior to the fracturing step, cube corner segments 12 could be bonded together at some point after the fracturing step if the initial sheeting were held in a fully supported position such that cube corner segments 12 would not be disoriented upon fracturing the initial sheeting. In particular, cube corner segments 12 can be bonded together after the fracturing step by securing conformable carrier layer 52 to front major surfaces 16 of cube corner segments 12.

Typically, protrusions 164 of tool 162 are arranged in the form of a pattern which is adapted to form a pattern of separations an the cube corner point side of the initial sheeting. Since cube corner segments 12 of conformable sheeting 10 are maintained in fixed relative positions by conformable carrier layer 52, the pattern of separations can generally be preserved after fracturing the sheeting. The pattern typically comprises a plurality of contiguous polygons selected from the group consisting of hexagons, parallelograms, and triangles (see FIGS. 2, 3, and 4 respectively).

Further, although a tool having a raised pattern of protrusions is typically used to form the separations in the sheeting, it is contemplated that a cutting device utilizing a laser beam or a sharp edge, e.g., a razor blade, could be used to form the separations by cutting completely or partially through the initial sheeting. If the cutting device were used to cut only partially through the initial sheeting, the initial sheeting could then be chilled and flexed to form separations completely through the initial sheeting at the positions of the partial cuts.

In an embodiment illustrated in FIG. 7, conformable sheeting 10a differs from conformable sheeting 10 because specularly reflective coating 56 has been deposited onto the facets of elements 20 to modify the retroreflective performance of the sheeting, and also eliminate the need for a back sealing film. Specularly reflective coating 56 can comprise metallic specularly reflective material such as aluminum or silver, or can comprise a dielectric mirror. U.S. Pat. No. 3,700,305 (Bingham) discloses retroreflective sheetings containing dielectric mirrors, and is incorporated herein by reference. If desired, adhesive layer 58 may be applied to the back side of specularly reflective coating 56. Adhesive layer 58 typically comprises a pressure-sensitive adhesive although other types if adhesive may be used if desired. Release liner 60 can be removably secured to adhesive layer 58. Release liner 60 is adapted to be easily removed from adhesive layer 58, typically immediately prior to adhering Sheeting 10a to a substrate (not shown).

Figure 8:
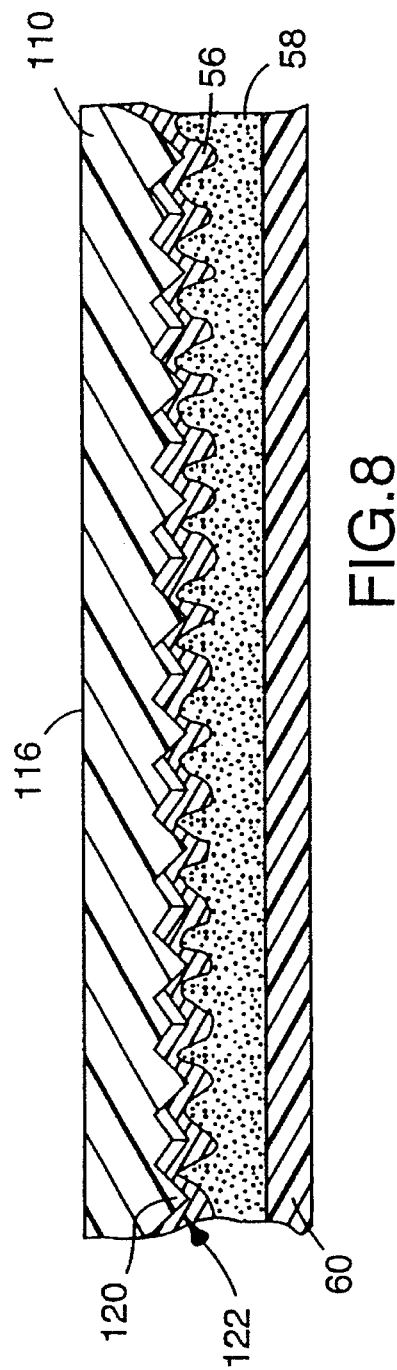
FIG. 8 is a diagrammatical cross section through a composite of an initial cube corner retroreflective sheeting, specuarly reflective layer, adhesive layer, and release liner used in making a conformable sheeting, the composite being cut away at each end.

Referring to FIG. 8, a conformable cube corner sheeting can alternatively be made by providing initial sheeting 110, depositing specularly reflective coating 56 on the cube corner point side 122 (onto the facets of cube corner elements 120) of initial sheeting 110, applying adhesive layer 58 onto the back side of specularly reflective coating 56, and removably securing release liner 60 to adhesive layer 58. In this embodiment of the invention, adhesive layer 58 and release liner 60 serve as the conformable carrier layer. Thus, adhesive layer 58 functions analogously to the above-described adhesive layer 54, and release liner 60 functions analogously to the above-described conformable carrier layer 52.

Figure 9:
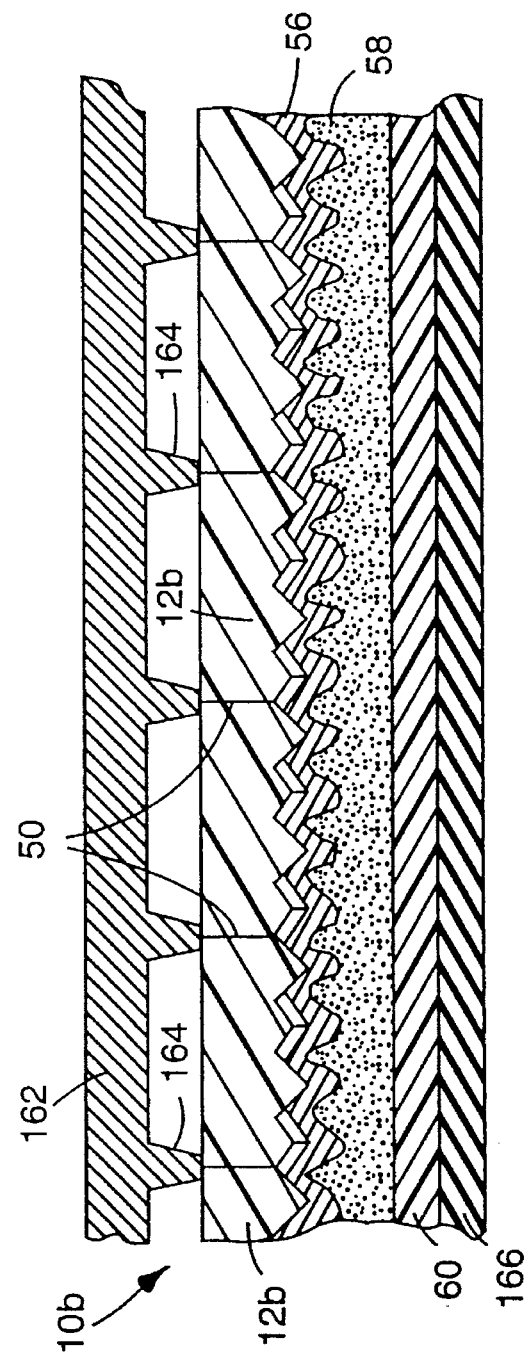
FIG. 9 illustrates the composite of FIG. 8 with the initial sheeting being divided into a plurality of discrete cube corner segments by a tool having a raised pattern of protrusions to thereby form a conformable sheeting.

Next, referring to FIG. 9, raised protrusions 164 of tool 162 are pressed against the front major surface of the initial sheeting in the same manner described above in connection with FIG. 6 to form separations 50 in the initial sheeting and thereby form conformable sheeting 10b. Rubber cushion 166 is typically provided on the side of the sheeting opposite tool 162 to assist in fracturing the sheeting. As the sheeting is fractured to form conformable sheeting 10b, specularly reflective coating 56 may also fracture at locations adjacent to separations 50, although these possible separations are not illustrated. In conformable sheeting 10b, adhesive layer 58 and release liner 60 conformably bond cube corner segments 12b together. Release liner 60 is adapted to be easily removed, typically immediately prior to adhering Sheeting 10b to a substrate (not shown).

In embodiments which are to be used in environments where the conformable cube corner retroreflective sheeting is likely to be exposed to moisture, e.g., outdoors or in high humidity, it may be preferred that cube corner retroreflective elements 20 be encapsulated with a conformable back sealing film. The aforementioned U.S. Pat. No. 4,025,159, which is incorporated in its entirety herein by reference, discloses encapsulation of cube corner retroreflective elements using a back sealing film. Such encapsulation provides an air interface adjacent the facets of cube corner elements 20 rather than a specularly reflective coating adjacent the facets and also provides a flat rear surface for bonding the sheeting to a substrate. An adhesive layer may be applied to the back side of the sealing film to provide a means for securing the sheeting to a substrate.

Figure 10:
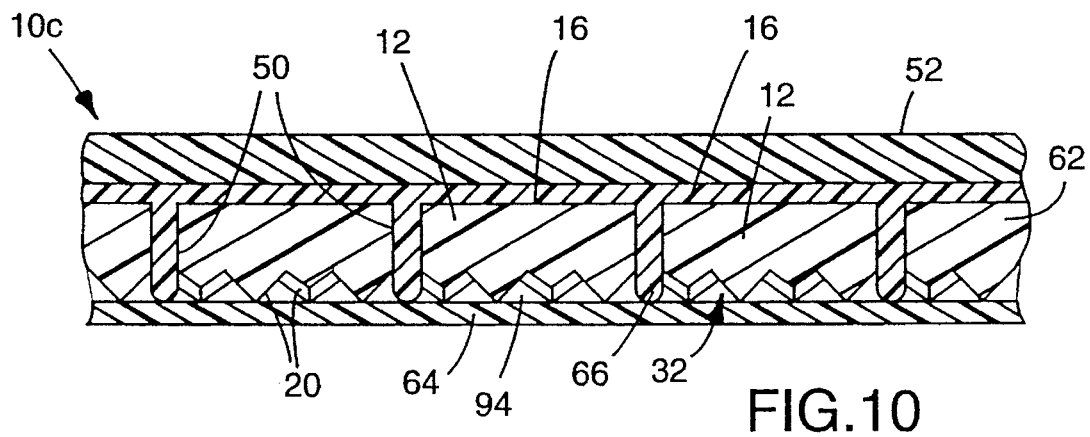
FIG. 10 is a cross section of a conformable sheeting comprising a conformable resin which substantially fills the separations of the sheeting, contacts cube corner segments separated by the separations to bond them together, and bonds a conformable back sealing film to the cube corner segments through rearwardly extending wall members or septa formed by beads of the conformable resin, the septa defining therebetween hermetically sealed cells or pockets for maintaining a substantially complete facet-air interface on the facets of the cube corner retroreflective elements.

Referring to FIG. 10, conformable sheeting 10c comprises a conformable back sealing film and is thus particularly useful in environments where the sheeting is likely to be exposed to moisture. Sheeting 10c also differs from conformable sheeting 10 because it comprises cube corner segments 12 conformably bonded together through conformable resin 62 which substantially fills separations 250 (i.e., the gaps between adjacent cube corner segments) and bonds the side walls of adjacent cube corner segments 12 together. Conformable resin 62 can comprise a material which has a low modulus relative to the materials of cube corner segments 12. Alternatively, conformable resin 62 can comprise a material which is extensible only at an elevated temperature (see the above analogous discussion of this concept relative to the conformable carrier layer). In particular, conformable resin 62 can comprise a conformable, natural or synthetic resin such as a thermally cured, urethane-modified polyester resin which is crosslinked with a melamine resin; a one-part urethane which can be cast and dried and is available under the trade designation Permuthane™ U 6729 from Permuthane Company, a division of Beatrice of Peabody, Mass.; a water-borne urethane which is available under the trade designation NeoRez™ R-963 from Zeneca Inc., a member of the ICI Group, of Elmhurst, Ill.; an ultraviolet radiation-curable aliphatic urethane acrylate; a water-based acrylic emulsion available under the trade designation Neocryl™ A 655 from ICI Polyvinyl Chemicals; polyurethanes; and plasticized poly(vinyl chloride).

Conformable sheeting 10c typically does not include an adhesive layer because conformable resin 62 acts as an adhesive in conformably bonding cube corner segments 12 together and in conformably bonding conformable carrier layer 52 to cube corner segments 12. Also, in sheeting 10c, conformable carrier layer 52 typically comprises a transparent, continuous top film which is adhered to front major surfaces 16 of cube corner segments 12 through comformable resin 62 which is also typically transparent. However, conformable carrier layer 52 could comprise a release liner which would typically be adhered to front major surfaces 16 of cube corner segments 12 through conformable resin 62. Further, sheeting 10c typically includes conformable back sealing film 64 disposed rearwardly of cube corner retroreflective elements 20. Back sealing film 64 typically comprises a continuous film. For example, back sealing film 64 can comprise a 2 mil (50 micron) thick polyurethane film (made from polyurethane pellets having the trade designation 58277 from B. F. Goodrich Company or polyurethane pellets having the trade designation PN-3429 or PN-03 from Morton International), or plasticized poly(vinyl chloride) film. Back sealing film 64 is conformably bonded to cube corner segments 12 through beads 66 of conformable resin 62. Beads 66 are disposed between adjacent cube corner segments 12 and function as wall members or septa which typically intersect with each other to separate the space between them into hermetically sealed cells or pockets 94 which are each free from contamination by dust particles or moisture to maintain a substantially complete facet-air interface on the facets of the cube corner retroreflective elements. When back sealing film 64 comprises a plasticized poly(vinyl chloride) film, conformable resin 62 preferably comprises a thermally cured, urethane-modified polyester resin which is crosslinked with a melamine resin.

Sheeting 10c can be made by providing a continuous, transparent film for use as conformable layer 52 and applying a layer of conformable resin 62 onto the film, the conformable resin 62 typically comprising a pressure-sensitive or a hot-melt adhesive. The film can then be laminated to the front major surface of an initial cube corner retroreflective sheeting with the conformable resin being adjacent the initial sheeting to form an intermediate composite. After an optional step of chilling this intermediate composite, the intermediate composite is pressed between a raised pattern die and a rubber cushion as described in connection with FIG. 6 to thereby divide the body portion of the initial cube corner retroreflective sheeting into discrete cube corner segments. This segmented composite can then be heated to about 200° F. (93° C.) and then pressed to soften the comformable resin. The cube corner segments should remain dimensionally stable under these conditions. The pressure forces the softened conformable resin to flow toward the rear of the sheeting through separations 50 to substantially fill separations 50. Typically, back sealing film 64 is placed adjacent the cube corner retroreflective elements of the segmented composite prior to heating and pressing the segmented composite. As back sealing film 64 and the segmented composite are heated and pressed, the softened conformable resin flows into separations 50 and then contacts back sealing film 64 at a location adjacent each separation 50 to form beads 66. Each bead 66 is typically in contact with a plurality of cube corner segments 12. Then, substantial solidification of the conformable resin is effected, typically by cooling it to a temperature at which it is no longer soft or by crosslinking the conformable resin to thereby bond back sealing film 64 to the cube corner segments of sheeting 10c.

Figure 11:
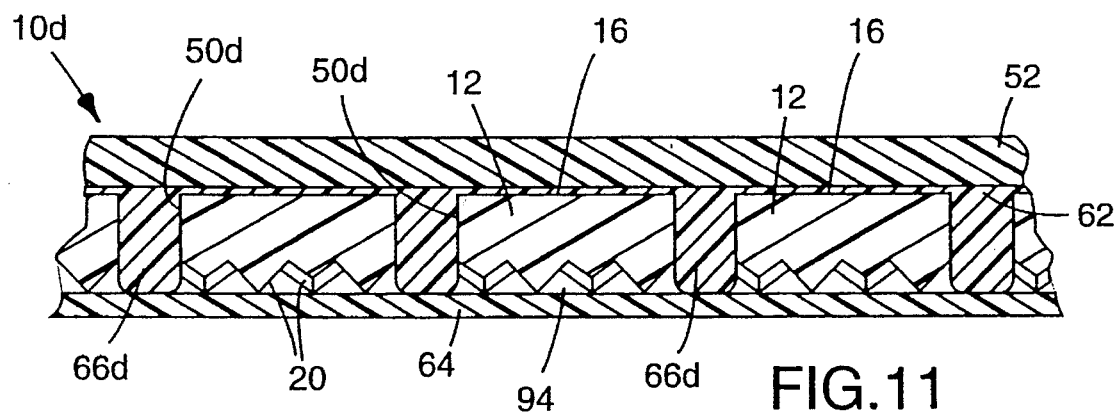
FIG. 11 illustrates a Sheeting which is similar to the sheeting of FIG. 10 but the gaps separating the cube corner segments have been made wider.

In yet another embodiment of a conformable sheeting, as shown in FIG. 11, conformable sheeting 10d comprises separations 50d which are relatively wide in comparison to the separations of the previously discussed sheetings of the invention. The width of each separation 50d, i.e., the gap between cube corner segments 12, is typically between about 0.5 and about 3 millimeters. Like sheeting 10c, sheeting 10d is particularly useful in environments where the sheeting is likely to be exposed to moisture because it comprises conformable back sealing film 64.

Conformable sheeting 10d differs from conformable sheeting 10c in the following respects. First, separations 50d are wider than separations 50 of sheeting 10c as noted above. Second, beads 66d of conformable resin 62 are typically larger in volume than beads 66 of sheeting 10c because beads 66d are used to conformably bond separations which are much wider than the separations of sheeting 10c. Thirdly, the thickness of the layer of conformable resin 62 disposed between front major surfaces 16 of cube corner elements 12 and conformable carrier layer 52 is typically less in sheeting 10d than in sheeting 10c because more conformable resin 62 is urged into the separations during the process of making sheeting 10d. In fact, if desired, sheeting 10d can be made such that there is very little conformable resin 62 disposed between front major surfaces 16 and conformable carrier layer 52 by,urging nearly all of the conformable resin into separations 50d during the process of making sheeting 10d.

Sheeting 10d is made in the same manner as sheeting 10c except that after the discrete cube corner segments are formed and before the segmented composite and back sealing film are pressed together, the segmented composite is typically heated to about 200° F. (93° C.) to soften conformable resin 62 and conformable carrier layer 52. Conformable carrier layer 52 and conformable resin 62 are then stretched or tentered in at least one direction, preferably at least two directions, in their respective planes to widen the separations of the segmented composite (increase the gaps between adjacent cube corner segments) and increase the area of conformable carrier layer 52 and conformable resin 62. Next, the segmented composite and back sealing film are pressed together in the same manner as described above in connection with sheeting 10c. The pressing operation forces the softened conformable resin to flow into separations 50d and toward the rear of the sheeting. As back sealing film 64 and the composite are pressed together, the softened conformable resin flows into separations 50d to form beads 66d. The conformable resin is then cured to complete the product.

Figure 12:
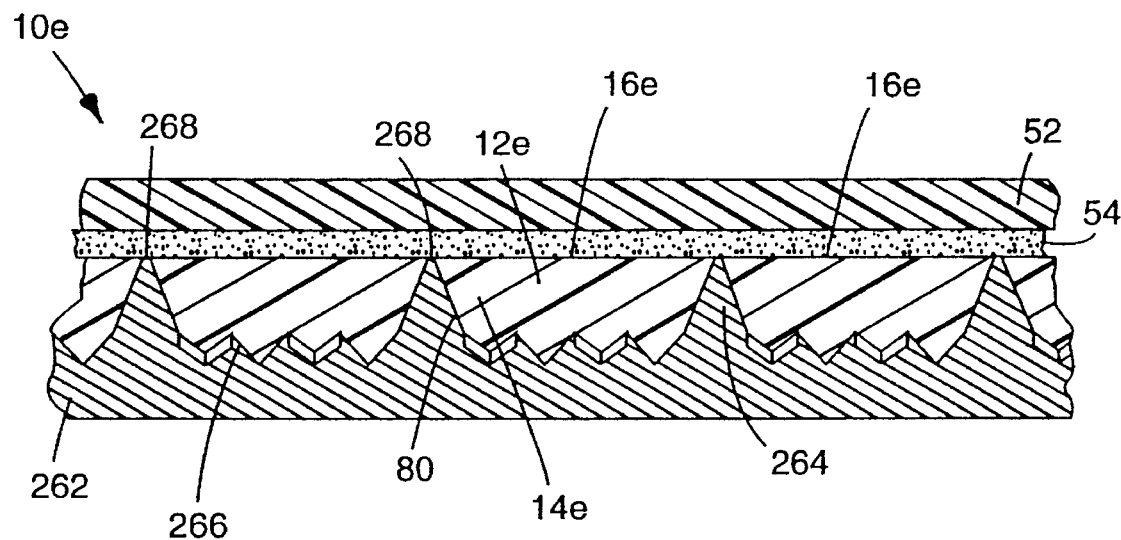
FIG. 12 is a cross section of a conformable cube corner retroreflective sheeting and a tool used to make the sheeting, the sheeting comprising a plurality of discrete cube corner segments having peripheries defined by inclined walls, the cube corner segments being conformably bonded together through a conformable carrier layer and optional adhesive layer.

In another of its aspects, the invention relates to a method for making a conformable cube corner retroreflective sheeting, comprising a conformable carrier layer. Referring to FIG. 12, in the first step of the method, tool 262 is provided, tool 262 having a plurality of raised protrusions 264 and retroreflective element-forming cavities or recesses 266 adapted for molding a conformable cube corner retroreflective sheeting like sheeting 10e. Next, a conformable sheeting like sheeting 10e can be made by placing a thermoplastic sheet onto the tool, heating the resin of the thermoplastic sheet to a temperature at least as high as its softening temperature, and pressing the sheet onto the tool to make a plurality of cube corner segments 12e. Raised protrusions 264 of tool 262 are typically used to form cube corner segments 12e having inclined walls 80 defining their peripheries. Preferably, the raised protrusions comprise a cross sectional shape in the form of an inverted and truncated V-shape so that the raised protrusions are adapted into form inverted and truncated V-shape separations in the completed sheeting between the cube corner segments so that cube corner segments 12e are discrete. The protrusions of the tool would typically form a pattern of separations in the sheeting. The pattern could comprise a plurality of contiguous polygons selected from the group consisting of hexagons, parallelograms, and triangles. Next, while the resin of the thusly formed cube corner segments is still at a temperature at least as high as its softening temperature, the resin is contacted with and laminated to conformable carrier layer 52 and optional adhesive layer 54, and the resin is then cooled to below its softening temperature, preferably to about room temperature, to conformably bond the cube corner segments together and form sheeting 10e. The completed sheeting is thereafter removed from the tool and is typically easily removed therefrom because cube corner segments 12e comprise inclined walls 80. Cube corner segments 12e of the sheeting are conformably bonded together through conformable carrier layer 52 and adhesive layer 54, with the gaps or separations between adjacent cube corner segments of a sheeting not yet removed from the tool being defined as equal to the widths 268 of protrusions 264.

Figure 13:
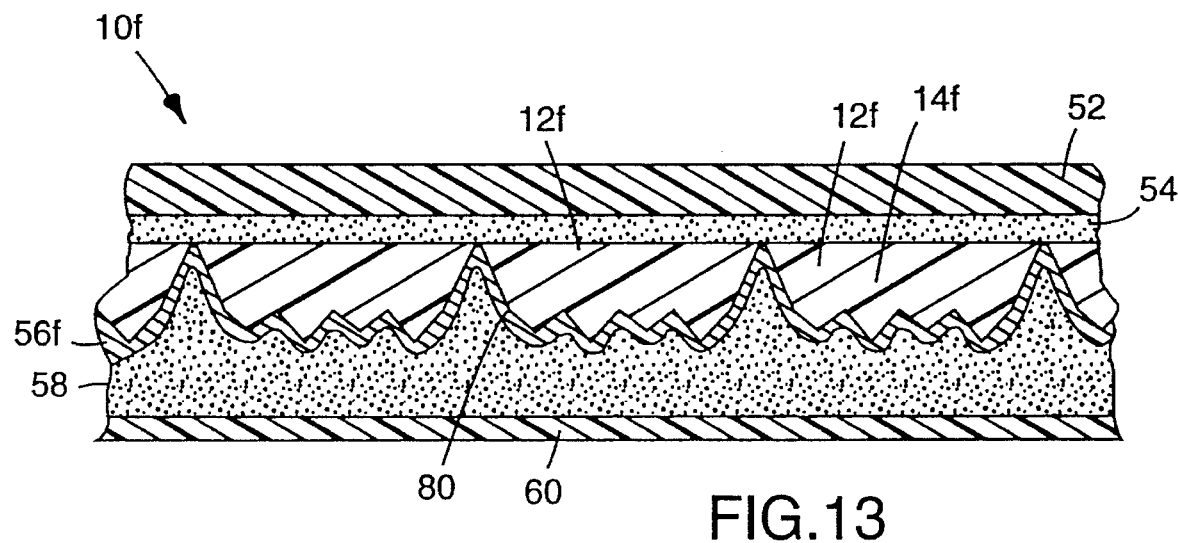
FIG. 13 is a cross section of a conformable sheeting which is similar to the sheeting of FIG. 12 but shows a specularly reflective coating, adhesive layer, and release liner applied to the sheeting.

If desired, this method can be practiced in continuous fashion by following the teachings of U.S. Pat. No. 4,601,861 (Pricone et al.) and U.S. Pat. No. 4,486,363 (Pricone et al.), each of which is incorporated herein by reference. Also, referring to FIG. 13, the method could further comprise coating the cube corner point side (the facets of the cube corner retroreflective elements and grooves of the conformable sheeting) with a specularly reflective coating 56f. An adhesive layer 58 could be applied onto Specularly reflective coating 56f, and a release liner 60 could be removably secured to the adhesive layer to form completed sheeting 10f.

In yet another of its aspects, the invention relates to a method for making a conformable cube corner retroreflective sheeting. This method is an alternative to the embossing method described immediately above. Referring again to FIG. 12, in the present method, tool 262 is again provided. However, in the next step of the method, a hardenable molding material is deposited on the molding surface of tool 262, the molding material preferably being essentially transparent and sufficient in amount and fluidity to essentially completely fill recesses 266 and typically sufficient in amount to cover raised protrusions 268. Then, conformable carrier layer 52 and optional adhesive layer 54 are applied to the molding material on the molding surface under sufficient pressure to effect intimate surface contact between carrier layer 52, raised protrusions 264, and the molding material. Typically, carrier layer 52 is rolled across the surface of tool 262 and pressed there against to urge the molding material away from protrusions 264 so that carrier layer 52 substantially contacts protrusions 264 and the molding material is, urged between protrusions 264. The molding material is then subjected to conditions sufficient to effect substantial solidification thereof and bonding to the adjacent surface of carrier layer 52 to form conformable sheeting 10e comprising discrete cube corner segments 12e. Conformable sheeting 10e is thereafter removed from the molding surface.

The molding material employed may be a molten thermoplastic resin, in which case the solidification thereof is accomplished at least in part by cooling with the inherent nature of the;thermoplastic resin producing bonding thereof to the carrier layer. Alternatively, the molding material may be a resin having cross-linkable groups, in which case solidification is accomplished at least in part by cross-linking of the resin. As an additional possibility, the molding material may be a partially polymerized resin formulation With solidification thereof being accomplished at least in part by effecting further polymerization in the formulation.

If desired, this method can be practiced in continuous fashion by following the teachings of U.S. Pat. No. 3,689,346 (Rowland), which is incorporated herein by reference.

Figure 14:
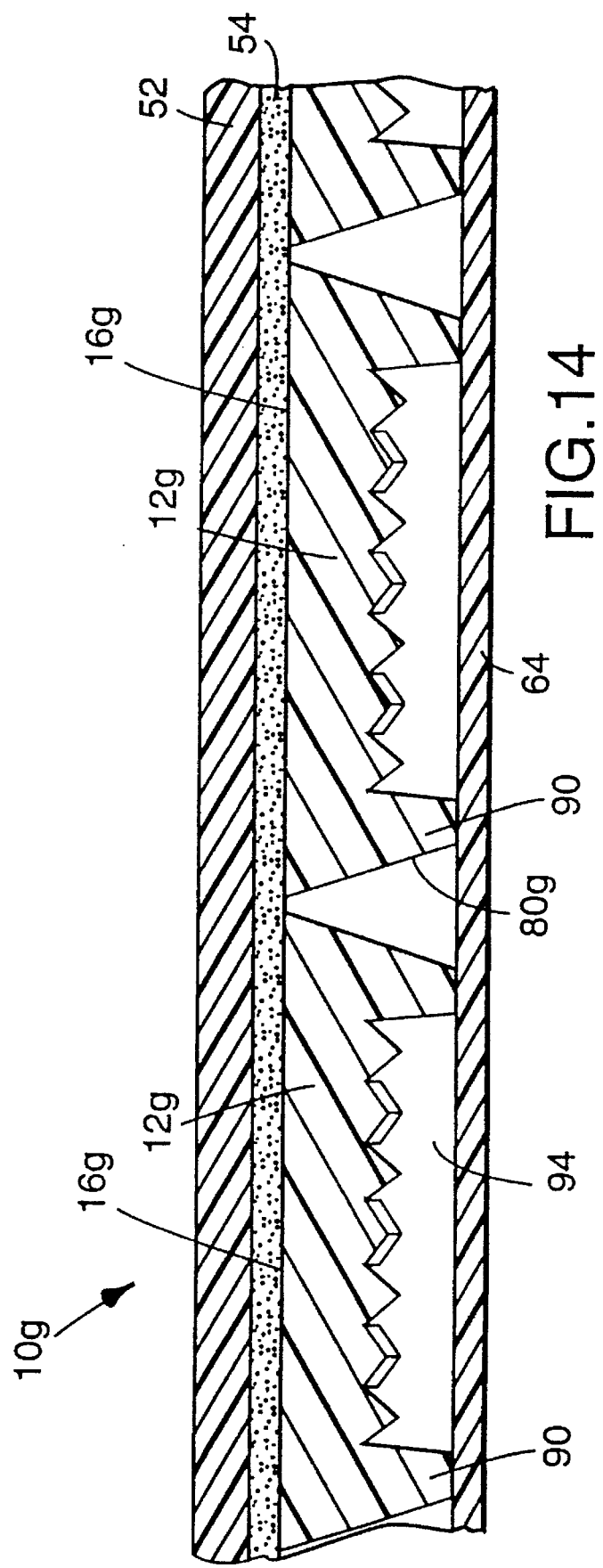
FIG. 14 is a cross section of a conformable sheeting comprising cube corner segments having peripheries defined by rearwardly extending septa which contact a back sealing film and define therebetween hermetically sealed cells or pockets for maintaining a substantially complete facet-air interface on the facets of the tube corner retroreflective elements.

Referring to FIG. 14, the invention further relates to conformable cube corner retroreflective sheeting 10g which is similar to sheeting 10e (FIG. 12) but comprises wall members or septa 90 which extend rearwardly into sealing contact with conformable back sealing film 64. Septa 90 preferably comprise inclined side walls 80. Sheeting 10g is also somewhat similar to sheeting 10c (FIG. 10) since both comprise rearwardly extending septa. As shown in FIG. 14, septa 90 typically define the peripheries of cube corner segments 12g. Because septa 90 are in sealing contact with back sealing film 64, hermetically sealed cells or pockets 94 are formed in sheeting 10g. The free edges of septa 90 are spaced rearwardly a distance greater than the peaks of the cube corner retroreflective elements such that an air space is formed within pockets 94. A pattern of separations formed by adjacent inclined walls 80g is typically formed in the same manner as the pattern formed in connection with sheeting 10e (FIG. 12).

Sheeting 10g is made in the same manner as sheeting 10e (FIG. 12) above, either by molding or embossing, except that the tool provided should have a shape adapted to form cube corner segments 12g, including septa 90 thereof, as shown in FIG. 14. Also, the free edges of septa 90 are bonded to a conformable back sealing film 64 by any of various means such as ultrasonic sealing; heat sealing with a hot, smooth surface applied against the back sealing film; adhesives, e.g., pressure sensitive adhesives, hot melt adhesives, or solvent-activatable adhesives; polymerizable materials; or by using a solvent which attacks the septa to make their free edges tacky and, preferably, making back sealing film 64 tacky to form a bond. Adhesives or polymerizable materials may be applied to the face of back sealing film 64, to the free edges of the septa, or both. It is important, however, to avoid exposure of the facets of the retroreflective elements to solvents, adhesives, and excessive heat or pressure.

Figure 15:
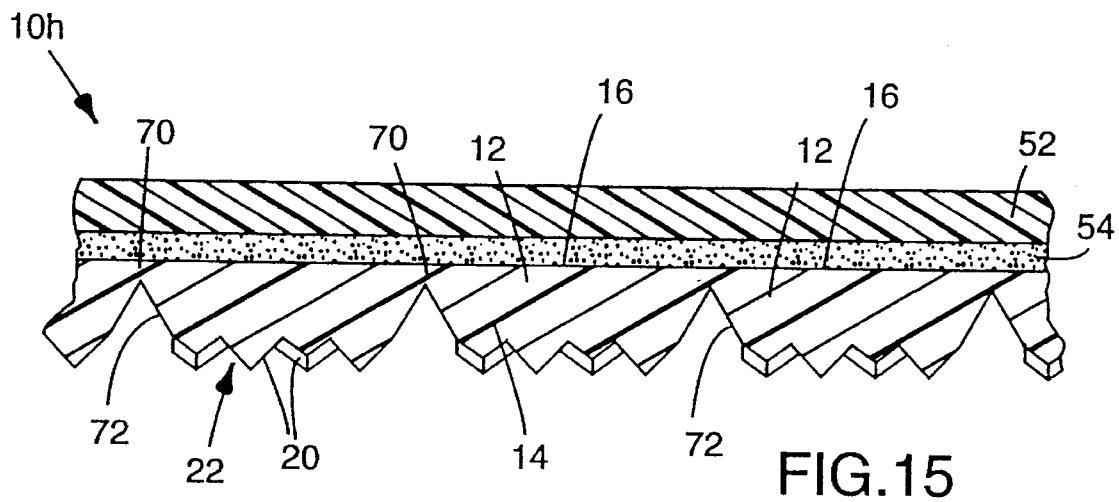
FIG. 15 is a cross section of a conformable cube corner retroreflective sheeting which comprises a plurality of cube corner segments having peripheries defined by grooves having inverted V-shape cross sections, and comprising connecting bridges which are above the grooves and disposed horizontally between and integral with adjacent cube corner segments, the connecting bridges being at least one of fractured and frangible.

Referring to FIG. 15, the invention also relates to conformable cube corner retroreflective sheeting 10h comprising a plurality of cube corner segments 12 and a plurality of connecting bridges 70 which are disposed horizontally between and are integral with adjacent cube corner segments 12. Each connecting bridge 70 is typically substantially thinner than body portions 14 of cube corner segments 12 adjacent to it and is typically made of the same material and in the same manufacturing step. Even though connecting bridges 70 and cube corner segments 12 are typically made from the same or similar materials, connecting bridges 70 can be made thin enough to be more frangible than cube corner segments 12. The material used in making connecting bridges 70 can typically be the same material used in making cube corner segments 12 if the thickness of connecting bridges 70 is less than about 3 mils (75 microns), preferably less than about 1 mil (25 microns). For example, each connecting bridge could be about 1 mil (25 microns) thick or less, and each body portion 14 could be about 2–4 mils (50–100 microns) thick.

Connecting bridges 70 can be made such that they are frangible and then fractured by, for example, pressing or stretching sheeting 10h such that connecting bridges 70 fracture. In particular, sheeting 10h can be made in such a manner that connecting bridges 70 are adapted to fracture upon application of the sheeting to nonplanar substrates like rivets or corrugated surfaces. Sheeting 10h is described as being conformable because connecting bridges 70 are frangible and can be fractured by applying the sheeting to nonplanar substrates. Once the connecting bridges fracture, the cube corner segments adjacent to the fractured connecting bridges are discrete. It is also contemplated that connecting bridges 70 could be fractured before application of the sheeting to a nonplanar substrate although fractured connecting bridges are not illustrated in FIG. 15. Thus, sheeting 10h can conform to nonplanar substrates because it comprises connecting bridges 70 which are at least one of fractured and frangible. The retroreflective performance of sheeting 10h is good because cube corner segments 12 are not dimensionally distorted when the sheeting is conformed to nonplanar substrates.

The peripheries or side walls of cube corner segments 12 are defined by grooves 72 extending vertically from cube corner point sides 22 of cube corner segments 12 toward front major surfaces 16 of body portions 14 and terminating at connecting bridges 70. Although the grooves are shown in FIG. 15 as having an inverted V-shape, the grooves can have other cross sectional shapes such as, for example, and inverted U-shape or an inverted V-shape wherein the apex of the V is truncated. Thus, connecting bridges 70 are located vertically above, and therefore span, grooves 72. Typically, the peripheries of cube corner segments 12 are defined by a pattern of grooves 72. The pattern can comprise a plurality of contiguous polygons selected from the group consisting of hexagons, parallelograms, and triangles.

Cube corner segments 12 of sheeting 10h are bonded together through conformable carrier layer 52. Conformable carrier layer 52 can be bonded to front major surfaces 16 through thermal lamination, and optional adhesive layer 54 can be interposed to ensure adhesion. For example, conformable carrier layer 52 can comprise a continuous, transparent film, and adhesive layer 54 can comprise a transparent adhesive.

Figure 16:
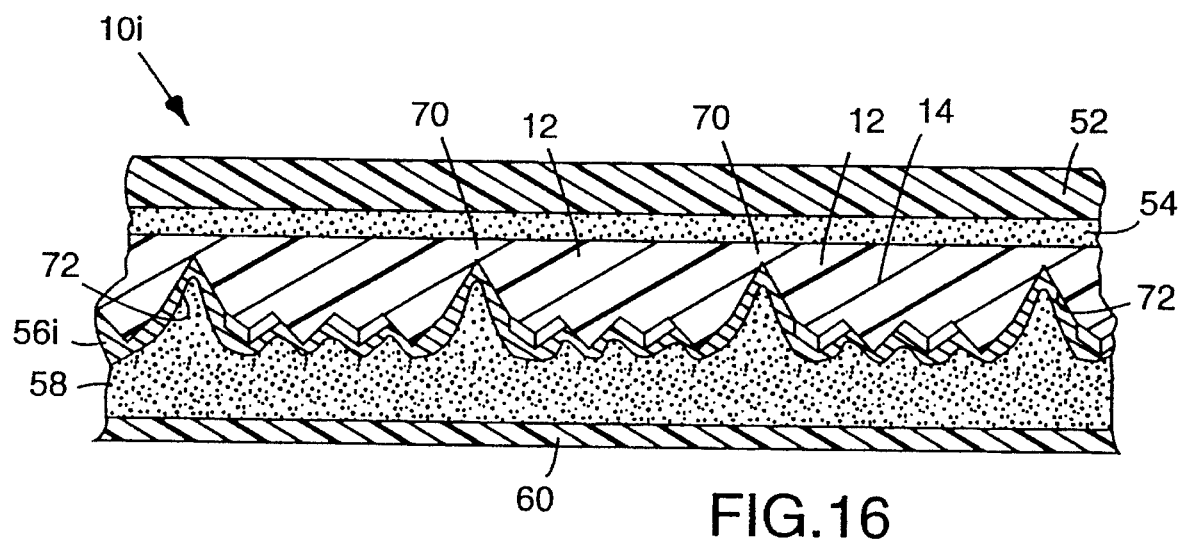
FIG. 16 is similar to FIG. 15 but shows a specularly reflective coating, adhesive layer, and release liner applied to the sheeting thereof.

Referring to FIG. 16, sheeting 10h can be used to make sheeting 10i. Sheeting 10i comprises specularly reflective coating 56i deposited onto the cube corner point side (the facets of the cube corner retroreflective elements) of each cube corner segment 12. Typically, the specularly reflective coating 56i would also coat grooves 72. Adhesive layer 58 would typically be applied on the rear surface of specularly reflective coating 56i. Also, a release liner 60 could be removably secured to adhesive layer 58.

It is further contemplated that a sheeting similar to sheeting 10h illustrated in FIG. 15 could be made by providing a tool similar to the one used in making sheeting 10g illustrated in FIG. 14. In other words, the tool would be adapted to form rearwardly extending septa in the sheeting On both sides of the connecting bridges. A conformable back sealing film could be sealed to the septa as described in connection with sheeting 10g.

Retroreflective sheetings of the present invention differ from previously known cube corner retroreflective sheetings in that they conform well to nonplanar substrates having intricate shapes or very small dimensions such as rivets 0r corrugated surfaces and maintain a high retroreflective brightness when thus conformed. Each sheeting of the invention comprises conformable materials Which conformably bond relatively rigid cube corner segments together. When a sheeting of the invention is conformed to a nonplanar substrate, the optical properties of the cube corner retroreflective elements of the rigid cube corner segments are not adversely affected because the cube corner segments are not distorted in shape as a result of the conforming. This lack of distortion is important because even slight distortion of the rigid cube corner segments would likely significantly impair the retroreflective brightness of the sheeting.

EXAMPLES

The invention will be further explained by the following illustrative examples Which are intended to be nonlimiting. All parts and percentages listed below are by weight unless otherwise indicated.

Unless otherwise indicated, retroreflectance (retroreflective brightness) was measured using a retroluminometer as described in U.S. defensive publication no. T987,003 at a divergence angle of about 0.2° and at an entrance angle of about −4°.

EXAMPLE 1

Conformable cube corner retroreflective sheetings were used to make a traffic cone and a police-type motorcycle helmet retroreflective. Each sheeting was made by first obtaining a 12"×12" (30.5 cm×30.5 cm) transparent poly-(vinyl chloride) sheet having a thickness of about 10 mils (250 microns) and using this poly(vinyl chloride) sheet as a conformable carrier layer, coating a pressure-sensitive polyalkyl acrylate adhesive onto the carrier layer at a thickness of about 5 mils (125 microns), and drying the adhesive by forced-air drying. A polymethyl methacrylate cube corner retroreflective sheeting was then laminated under pressure to the adhesive with the smooth side of the retroreflective sheeting facing the adhesive. The cube corner point side of each composite was then scored with a razor blade in a 0.25" (0.6 cm) square grid pattern. The entire acrylic layer of each sheeting was cut through but the carrier layers were not cut.

The segmented composite sheetings were then heat and vacuum formed at about 190° F. (88° C.) to soften the carrier layer but not the acrylic sheetings and firmly conform the sheetings to the exterior surfaces of the traffic cone and motorcycle helmet. The heat and vacuum forming caused the carrier layer to have a larger surface area but a smaller thickness. Also, the separations between the cube corner segments were wider after the heat and vacuum forming. The retroreflective brightness was measured and found to be about 350 candela/lux/meter$^2$ for the traffic cone and about 375 candela/lux/meter$^2$ for the motorcycle helmet. The initial retroreflective sheetings had retroreflective brightnesses of about 1200 candela/lux/meter$^2$.

EXAMPLE 2

A conformable cube corner retroreflective sheeting was made by providing a 2 mil (50 micron) thick polyurethane film (made from polyurethane pellets having the trade designation 58277 from B. F. Goodrich Company, Specialty Polymers & Chemical Division, of Cleveland, Ohio) as the conformable carrier layer, coating a 2 mil (50 micron) thick pressure-sensitive polyalkyl acrylate adhesive onto the polyurethane carrier layer, and laminating the planar front major surface of a 12–17 mils (300–425 microns) thick polymethyl methacrylate cube corner retroreflective sheeting onto the adhesive. Next, a 1,200 Angstroms (0.12 micron) thick silver vapor coat was deposited onto the facets of the cube corner retroreflective elements, a 5 mil (125 micron) thick polyalkyl acrylate adhesive was coated onto the silver vapor coat, and a 4 mil (100 micron) thick polyethylene film was used as a release liner and removably secured to the bottom adhesive layer.

This composite was then laid on dry ice having a temperature of about −109° F. (−78° C.) for three minutes to chill the acrylic cube corner sheeting. The composite was then placed on a rubber cushion with the polyethylene release liner adjacent the rubber cushion. A tool having a plurality of raised protrusions in a hexagonal pattern was then pressed against the polyurethane carrier layer at a pressure of about 200 lb/in$^2$ (1.38×10$^6$ N/m$^2$) for less than a second. The tool and rubber cushion cooperated to stress the portions of the cube corner sheeting located closest to the protrusions of the tool to cause the sheeting to generally fracture along the apices of the microreplicated grooves located closest to the protrusions of the tool. Thus, damage to the cube corner retroreflective elements was minimized.

The polyethylene release liner of the conformable cube corner retroreflective sheeting was removed to expose the bottom adhesive layer and the conformable sheeting was firmly adhered to a rivet on a truck trailer. After application of the sheeting to the rivet, the sheeting was observed to have a retroreflective brightness of about 500 candela/lux/meter$^2$.

EXAMPLE 3

A conformable cube corner retroreflective sheeting was made by first proving an approximately 15 mil (375 micron) thick Scotchlite™ Diamond Grade retroreflective sheeting made from polymethyl methacrylate (available from 3M Company of St. Paul, Minn.). By vapor deposition under vacuum, a specularly reflective aluminum coating was coated on the cube corner point side of the sheeting to an opaque thickness of about 1,200 Angstroms (0.12 micron). A 5 mil (125 micron) thick 9469PC Scotch™ VHB Joining System acrylic pressure-sensitive adhesive (available from 3M Company) was laminated to the aluminum coating using a pressure of about 40 lb/in$^2$ (275,700 N/m$^2$) and covered with a 4 mil (100 micron) thick polyethylene release line.

This composite was then laid on a tool having a plurality of raised protrusions in a hexagonal pattern with the planar side of the sheeting disposed adjacent the protrusions. A rubber roller was rolled against the outside surface of the composite at a rate of about 88 feet/minute (27 meters/minute) to press the composite against the protrusions at a pressure of about 90 lb/in$^2$ (620,350 N/m$^2$). The fractured sheeting had an average retroreflective brightness of about 1060 candela/lux/meter$^2$.

After heating the composite to about 150° F. (65.5° C.) to soften the adhesive and polyethylene release liner, the composite was centered or biaxially stretched to widen the separations. The composite was stretched in two perpendicular, planar directions to a size about 16.5% larger than its previous size. After cooling the composite to room temperature, the polyethylene liner was exchanged for a silicone-coated paper release liner. The retroreflective brightness of the tentered sheeting was measured and found to be about 760 candela/lux/meter$^2$.

A three mil (75 micron) thick ultraviolet radiation-curable, conformable resin layer was then bar coated on the polymethyl methacrylate side of the composite to substantially fill the widened separations and continuously cover each cube corner segment. The resin comprised 75% Ebecryl™ 8400, an aliphatic urethane diacrylate, available from Radcure Specialties, Inc. of Louisville, Ky., 24% Photomer™ 4127, an aliphatic difunctional acrylate, available from Henkel Corp. of Morristown, N.J., and 1% Darocur™ 1173, an aromatic ketone free radical photoinitiator, available from EM Industries, Inc. of Hawthorne, N.J. A 2 mil (50 micron) thick polyester film was laminated to ithe resin, and the resin was cured through the polyester with a source of ultraviolet radiation for 2 minutes to substantially completely cure the resin. Upon removing the polyester film, the finished product had a retroreflective brightness of about 650 candela/lux/meter$^2$.

Various modifications and alterations of this invention will become apparent to those skilled in the art without departing from the Scope and spirit of this invention.

What is claimed is:

1. A conformable cube corner retroreflective sheeting comprising a plurality of discrete cube corner segments which are conformably bonded together through a conformable carrier layer, each cube corner segment comprising a plastic body portion capable of retroreflecting light, and having a substantially planar front major surface and side walls and at least one minute cube corner retroreflective element comprising a plurality of faces, said faces projecting from said body portion.

2. The sheeting of claim 1 wherein substantially all of the cube corner retroreflective elements located closest to said side walls are intact and capable of retroreflecting light.

3. The sheeting of claim 1 wherein the peripheries of said cube corner segments are defined by a plurality of separations extending from said rear surfaces of said body portions to said front major surfaces, the separations being disposed between adjacent cube corner segments.

4. The sheeting of claim 3 wherein said cube corner segments are defined by a pattern of said separations.

5. The sheeting of claim 4 wherein said pattern comprises a plurality of contiguous polygons selected from the group consisting of parallelograms, triangles, and hexagons.

6. The sheeting of claim 1 wherein adjacent cube corner segments are separated by a gap of less than about 1 millimeter and conformably bonded together through a conformable carrier layer.

7. The sheeting of claim 6 wherein said conformable carrier layer is bonded to said front major surfaces of said body portions.

8. The sheeting of claim 7 wherein said conformable carrier layer comprises a continuous, transparent film and is bonded to said front major surfaces through a transparent adhesive.

9. The sheeting of claim 1 further comprising a specularly reflective coating on the rear surfaces of said body portions of of said cube corner segments.

10. The sheeting of claim 9 further comprising an adhesive on said specularly reflective coating.

11. The sheeting of claim 1 wherein said cube corner segments are conformably bonded together through a conformable resin which bonds the side walls of adjacent cube corner segments together.

12. The sheeting of claim 11 wherein the separation between adjacent cube corner segments ranges between about 0.5 and about 3 millimeters.

13. The sheeting of claim 11 furthercomprising a back sealing film disposed adjacent said cube corner retroreflective elements and bonded to said cube corner segments through said conformable resin.

14. The sheeting of claim 11 wherein a continuous, transparent film is bonded to said front major surfaces through said conformable resin, said conformable resin being transparent.

15. The sheeting of claim 1 further comprising septa which extend rearwardly into sealing contact with a conformable back sealing film, said septa defining hermetically sealed cells or pockets in said sheeting.

16. A conformable cube corner retroreflective sheeting comprising a plurality of discrete cube corner segments bonded together through a conformable carrier layer, each cube corner segment comprising a plastic body portion capable of retroreflecting light, and having a substantially planar front major surface and at least one minute cube corner retroreflective element comprising a plurality of faces, said faces projecting from the rear surface of said body portion, wherein the side walls of said cube corner segments are defined by grooves extending vertically from said rear surfaces of said cube corner segments toward said front major surfaces and terminating at connecting bridges which are disposed horizontally between and are integral with adjacent cube corner segments, said connecting bridges being at least one of fractured and frangible.

17. The sheeting of claim 16 wherein each of said connecting bridges is substantially thinner than and made of the same material as adjacent body portions of said cube corner segments.

18. The sheeting of claim 16 wherein said grooves have a cross sectional shape selected from the group consisting of: an inverted V-shape, an inverted U-shape, and an inverted V-shape wherein the apex of the V is truncated.

19. The sheeting of claim 16 wherein said cube corner segments are defined by a pattern of said grooves.

20. The sheeting of claim 19 wherein said pattern comprises a plurality of contiguous polygons selected from the group consisting of parallelograms, triangles, and hexagons.

* * * * *

UNITED STATES PATENT AND TRADEMARK OFFICE
CERTIFICATE OF CORRECTION

PATENT NO. : 5,614,286
DATED : March 25, 1997
INVENTOR(S) : Chester A. Bacon, Jr. and Gerald M. Benson It is certified that error appears in the above-indentified patent and that said Letters Patent is hereby corrected as shown below:

Title page, [57] Abstract, line 5 "minutes" should read --minute--.

Title page, [57] Abstract, at the end after "together." insert --Alternatively, a conformable cube corner retroreflective sheeting can comprise a plurality of connecting bridges disposed between adjacent cube corner segments, the connecting bridges being at least one of fractured and frangible, and spanning grooves which extend vertically from the cube corner point sides toward the front major surfaces and terminate at the connecting bridges. Also, methods for making such conformable sheetings.--

Col. 2, line 64, "Side" should read --side--.
Col. 3, line 40, "Or" should read --or--.
Col. 6, line 6, "Sheeting" should read --sheeting--.
Col. 6, line 26, "tube" should read --cube--.
Col. 7, line 21, "tube" should read --cube--.
Col. 8, line 26, "so,that" should read --so that--.
Col. 8, line 27, "retrore elective" should read --retroreflective--.
Col. 8, line 50, "module" should read --moduli--.
Col. 9, line 32, "62" should read --162--.

UNITED STATES PATENT AND TRADEMARK OFFICE
CERTIFICATE OF CORRECTION

PATENT NO. : 5,614,286
DATED : March 25, 1997
INVENTOR(S) : Chester A. Bacon, Jr. and Gerald M. Benson It is certified that error appears in the above-indentified patent and that said Letters Patent is hereby corrected as shown below:

Col. 10, line 10, "an" should read --on--.
Col. 10, line 46, "Sheeting" should read --sheeting--.
Col. 11, line 7, "Sheeting" should read --sheeting--.
Col. 11, line 29, "250" should read --50--.
Col. 13, line 50, "into" should read --to--.
Col. 14, line 14, "Specularly" should read --specularly--.
Col. 14, line 47, "the;thermoplastic" should read --the thermoplastic--.
Col. 14, line 53, "With" should read --with--.
Col. 15, line 17, "pressure sensitive-- should read --pressure-sensitive--.
Col. 16, line 37, "On" should read --on--.
Col. 16, line 44, "Or" should read --or--.
Col. 16, line 47, "Which" should read --which--.
Col. 16, line 60, "Which" should read --which--.
Col. 18, line 33, "centered" should read --tentered--.
Col. 18, line 53, "ithe" should read --the--.
Col. 18, line 61, "Scope" should read --scope--.

UNITED STATES PATENT AND TRADEMARK OFFICE
CERTIFICATE OF CORRECTION

PATENT NO. : 5,614,286
DATED : March 25, 1997
INVENTOR(S) : Chester A. Bacon, Jr. and Gerald M. Benson It is certified that error appears in the above-indentified patent and that said Letters Patent is hereby corrected as shown below:

Col. 19, line 32, "of" second occurrence should be deleted.

Col. 20, line 1, "furthercomprising" should read --further comprising--.

Signed and Sealed this

Twenty-ninth Day of May, 2001

Attest:

NICHOLAS P. GODICI

*Attesting Officer*  *Acting Director of the United States Patent and Trademark Office*